US010516199B2

(12) United States Patent
Camacho Perez et al.

(10) Patent No.: US 10,516,199 B2
(45) Date of Patent: Dec. 24, 2019

(54) MOBILE DEVICE WITH SLOTTED CAVITY ANTENNA

(71) Applicant: North Inc., Kitchener (CA)

(72) Inventors: Jose Rodrigo Camacho Perez, Guadalajara Jalisco (MX); Aycan Erentok, Santa Clara, CA (US); Bryce D. Horine, Portland, OR (US); Brian Girvin, Gilroy, CA (US)

(73) Assignee: North Inc., Kitchener, ON (CA)

( * ) Notice: Subject to any disclaimer, the term of this patent is extended or adjusted under 35 U.S.C. 154(b) by 287 days.

(21) Appl. No.: 15/417,108

(22) Filed: Jan. 26, 2017

(65) Prior Publication Data

US 2018/0212309 A1 Jul. 26, 2018

(51) Int. Cl.
*H01Q 1/22* (2006.01)
*H04B 1/3827* (2015.01)
*H01Q 1/27* (2006.01)
*H01Q 13/06* (2006.01)
*H01Q 13/18* (2006.01)

(52) U.S. Cl.
CPC ......... *H01Q 1/2291* (2013.01); *H01Q 1/2283* (2013.01); *H01Q 1/273* (2013.01); *H01Q 13/06* (2013.01); *H01Q 13/18* (2013.01); *H04B 1/385* (2013.01); *H04B 2001/3866* (2013.01)

(58) Field of Classification Search
CPC .... H01Q 1/2291; H01Q 1/2283; H01Q 1/273; H01Q 1/276; H01Q 1/52; H01Q 1/526; H01Q 13/06; H01Q 13/18; H04B 1/385; H04B 2001/3866
See application file for complete search history.

(56) References Cited

U.S. PATENT DOCUMENTS

| | | |
|---|---|---|
| 5,926,144 A | 7/1999 | Bolanos et al. |
| 8,269,671 B2 | 9/2012 | Chen et al. |
| 8,384,596 B2 | 2/2013 | Rofougaran et al. |
| 8,421,686 B2 | 4/2013 | Soler Castany et al. |
| 9,160,064 B2 | 10/2015 | Ferguson |
| 9,252,077 B2 | 2/2016 | Molzer et al. |
| 2008/0079638 A1 | 4/2008 | Choi et al. |
| 2008/0186247 A1 | 8/2008 | Cotte et al. |
| 2009/0153412 A1* | 6/2009 | Chiang .................... H01Q 1/52 343/702 |

(Continued)

FOREIGN PATENT DOCUMENTS

| | | |
|---|---|---|
| CN | 104216139 A | 12/2014 |
| WO | 2015166345 A2 | 11/2015 |

OTHER PUBLICATIONS

Mendes, P.M., et al. "Integrated chip-size antennas for wireless microsystems: Fabrication and design considerations" Sensors and Actuators A 125 (2006) 217-222.

(Continued)

*Primary Examiner* — Robert Karacsony
(74) *Attorney, Agent, or Firm* — Thomas Mahon

(57) ABSTRACT

A wearable mobile device may include circuitry for transmissive communication, and a slotted cavity radiator in communication with the circuitry for transmissive communication to transmit or receive transmissive communication. In embodiments, the wearable mobile device may further include a pair of conductive faces between which the circuitry for transmissive communication is positioned and that bound a cavity of the slotted cavity radiator.

18 Claims, 8 Drawing Sheets

(56) References Cited

U.S. PATENT DOCUMENTS

2011/0234461 A1  9/2011 Grange et al.
2015/0186702 A1  7/2015 Pletcher et al.
2018/0212314 A1* 7/2018 Rautio ................... H01Q 1/245

OTHER PUBLICATIONS

International Search Report and Written Opinion dated Apr. 30, 2018 for International Application No. PCT/US2018/014572, 13 pages.

* cited by examiner

US 10,516,199 B2

MOBILE DEVICE WITH SLOTTED CAVITY ANTENNA

TECHNICAL FIELD

The present disclosure relates generally to mobile devices and more particularly to a wearable mobile device that may include a slotted cavity antenna.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Mobile devices, such as mobile telephones, tablet computers, "phablets," wearable devices such as smart watches, Internet of Things (IoT) devices, etc., typically include circuitry for electronic processing and for transmissive communication that may include transmitting and/or receiving signals. Such devices may also include an antenna that may be used in the transmissive communication. In some embodiments, efficiency of transmissive communication and/or the antenna may be adversely affected by materials and/or components of the mobile device. In embodiments of mobile devices that may be wearable, efficiency of transmissive communication and/or the antenna may be adversely affected by the body of a person wearing the device.

DETAILED DESCRIPTION

Figure 1:
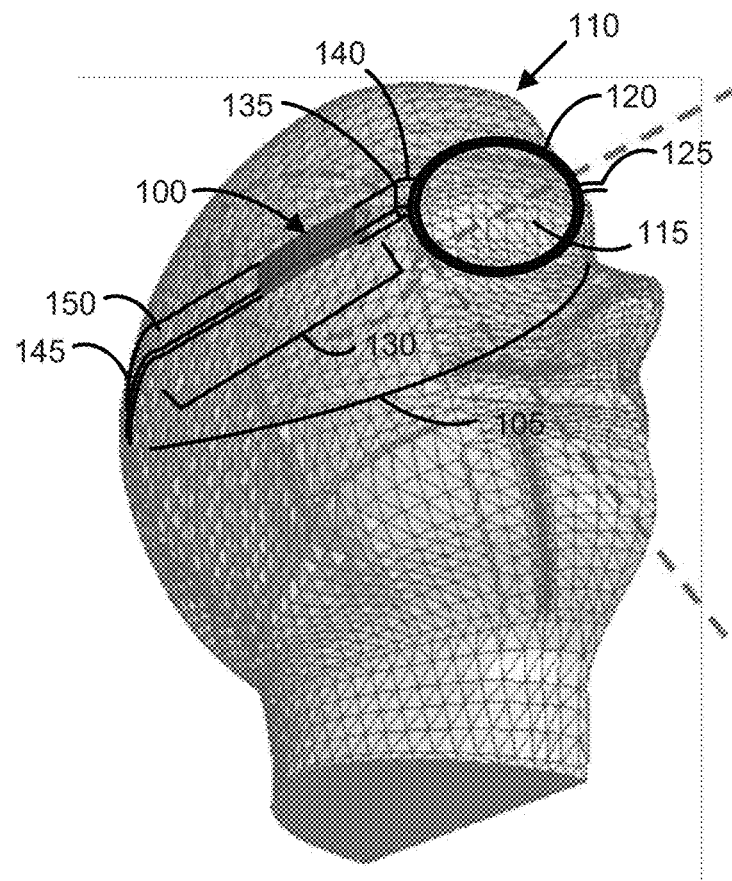
FIG. 1 illustrates a wearable device as an example of an operating environment of a mobile device according to some embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates as an example of an operating environment of a mobile device 100 according to some embodiments. As shown, a wearable device 105 may include mobile device 100. Wearable device 105 may include mobile device 100 in that, in embodiments, mobile device 100 may be included in, incorporated into, or integral with wearable device 105, as illustrated, or may be removeably attached or fixed to wearable device 105. Mobile device 100 may include transmission circuitry for transmitting and receiving communication signals, including a slotted cavity antenna of the present disclosure, to be described more fully below.

FIG. 1 illustrates a fragmentary view of a wearable device 105, illustrated as a right-side portion of eyeglasses, sometimes referred to as a pair of eyeglasses, that may be worn on a person's or user's head 110. It will be appreciated that the eyeglasses, which may also be referred to herein as eyeglasses 105 as an example of wearable device 105, would commonly include a left-side portion (not illustrated) that may be substantially the same as the illustrated right-side portion, except that the left-side portion made be reversed right-to-left with respect to the left side. In embodiments the left-side portion (not illustrated) may not include a mobile device 100. In other embodiments, the left-side portion (not illustrated) may include a mobile device analogous to mobile device 100, or some other components that can support operation of the mobile device such as a battery. Wearable device or eyeglasses 105 may be referred to as "headworn" in that they may be worn on a person's head 110.

In embodiments, eyeglasses 105 may include for each eye of a person a lens 115 that may optionally be held or bounded by a rim 120. A bridge 125 may be connected between the lens 115 and/or the rim 120 for each of the eyes. A temple 130, sometimes referred to as an arm 130, may extend backward or anteriorly from each rim 120 or lens 115. Some embodiments may include a hinge 135 that may be coupled between temple 130 and an end piece 140 at rim 120 or lens 115 so that each temple 130 may be folded relative to and/or across lens 115. Some embodiments may include an earpiece 145 that may extend from a posterior end 150 of temple 130 to wrap around a person's ear.

In embodiments as illustrated in FIG. 1, for example, mobile device 100 may be incorporated into and/or integral with temple 130 of eyeglasses 105. Mobile device 100 may operate as and/or communicate with any of a variety of devices, such as mobile telephones, tablet computers, "phablets," other wearable devices such as smart watches, Internet of Things (IoT) devices, etc. In connection with eyeglasses 105, for example, mobile device 100 may operate as a wearable device sometimes referred to as "smart glasses."

Figure 2:
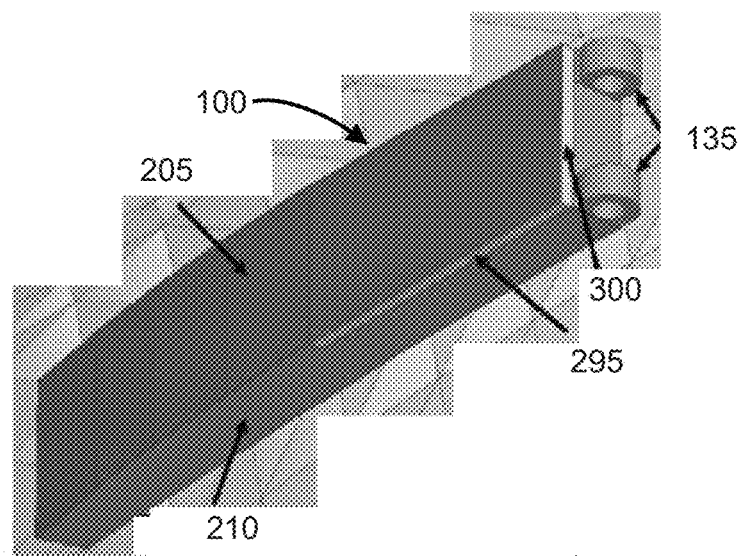
FIG. 2 is an enlarged isometric view of mobile device shown separate from the wearable device, for purposes of illustration.
Figure 3:
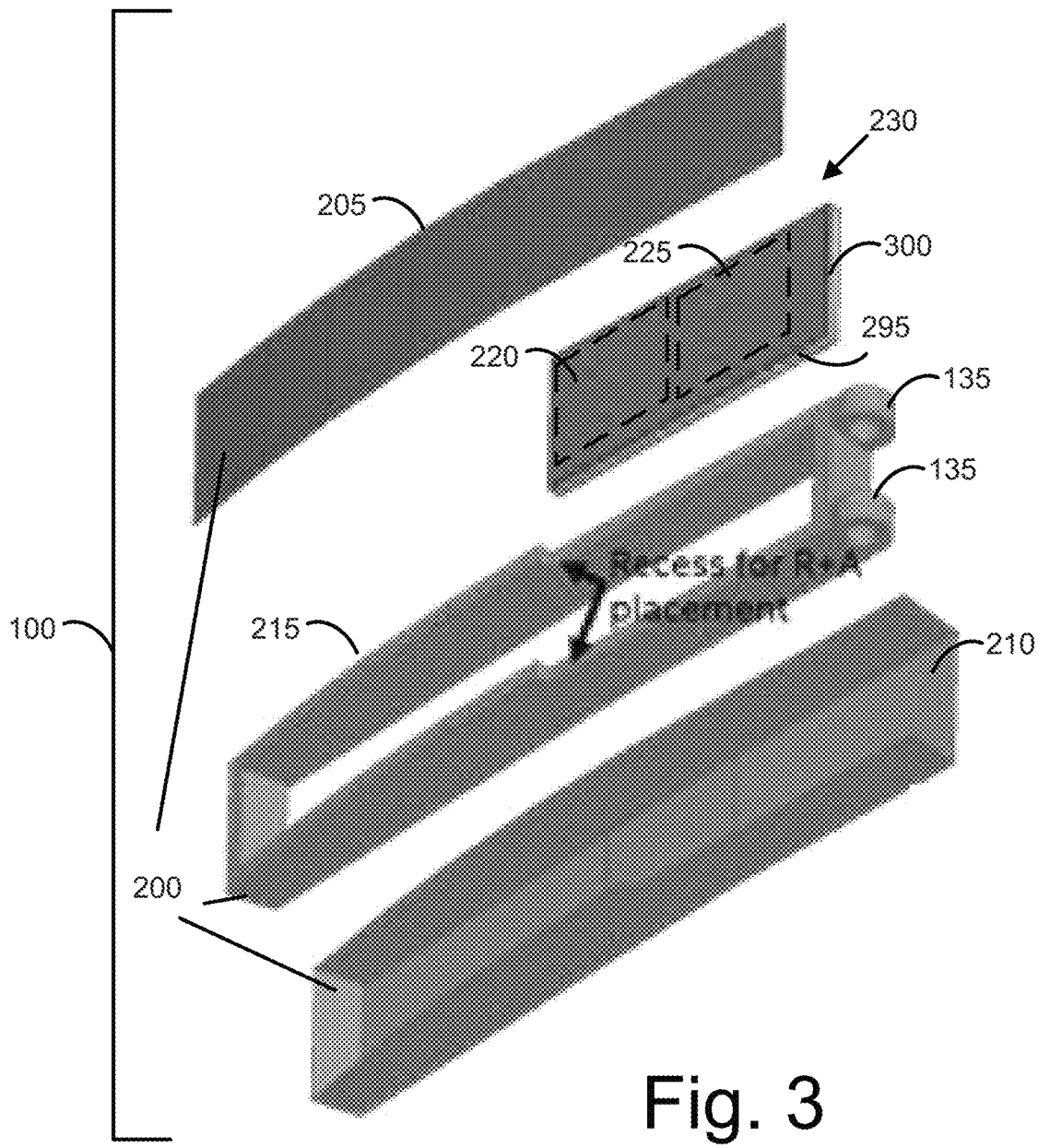
FIG. 3 is a partial exploded isometric view of a mobile device, according to some embodiments, shown generally as may be viewed from a lateral perspective that may be away from user's head.
Figure 4:
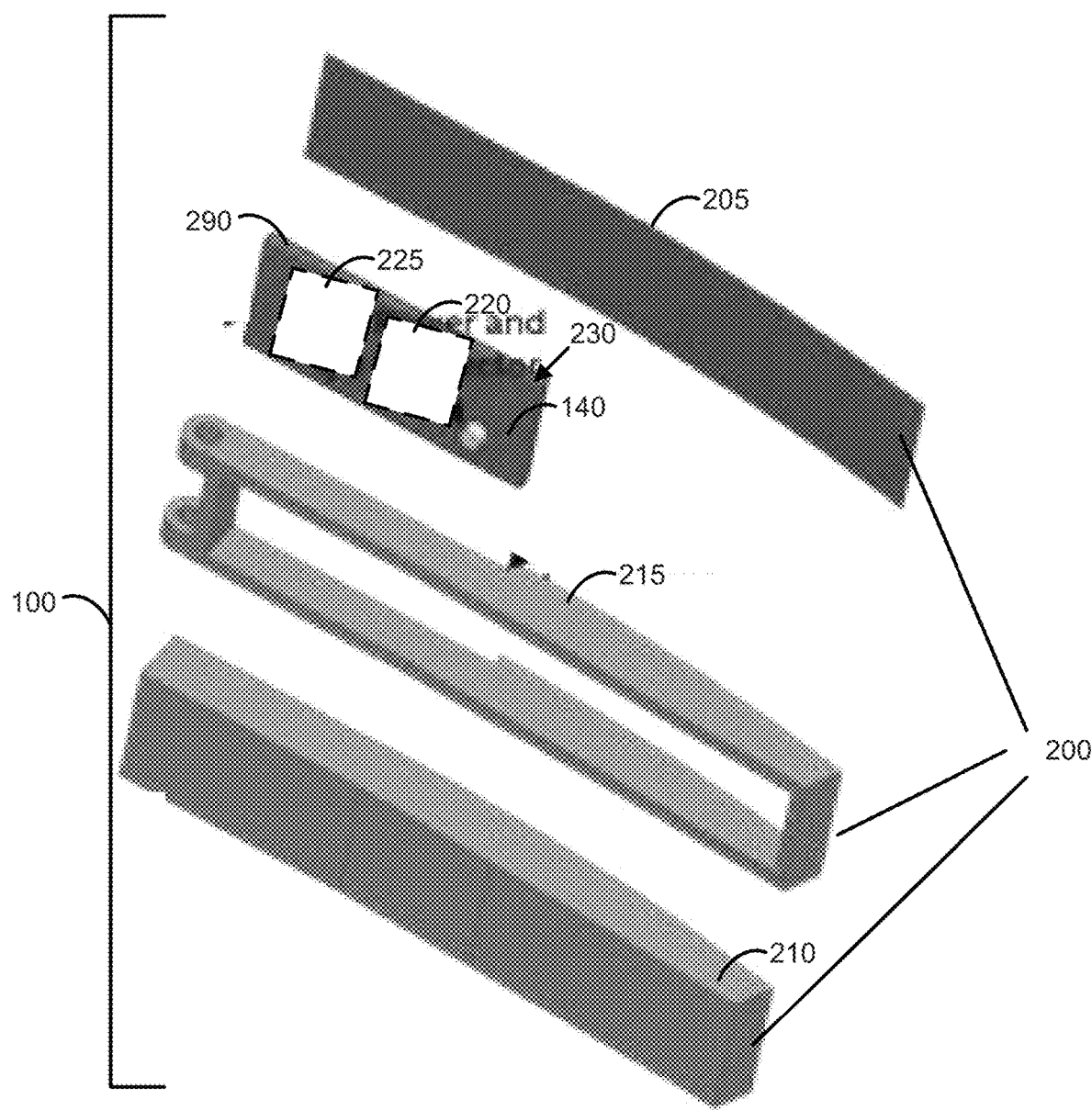
FIG. 4 is a partial exploded isometric view of a mobile device, according to some embodiments, shown generally as may be viewed from a medial perspective that may be toward user's head.

FIG. 2 is an enlarged isometric view of mobile device 100 shown separate from wearable device or eyeglasses 105, for purposes of illustration. FIG. 3 is a partial exploded isometric view of mobile device 100, shown generally as may be viewed from a lateral perspective looking toward user's head 110. FIG. 4 is a partial exploded isometric view of mobile device 100, shown generally as may be viewed from a medial perspective looking away from user's head 110.

With reference to FIGS. 2-4, mobile device 100 may include a housing 200 that may include a front cover 205 and a back cover 210 that may be supported on opposite sides of a frame 215. In embodiments, front cover 205 and back cover 210 may also be referred to as lateral cover 205 and medial cover 210 due to covers 205 and 210 being in lateral and medial positions, respectively, relative to the person's body. Housing 200 may support and/or house circuitry 220 (shown in outline) and an antenna 225 (shown in outline) that, in embodiments, may be integrated together as an integrated circuitry and antenna device 230. In other embodiments, circuitry 220 and antenna 225 may be separate from each other. In an embodiment, as illustrated, frame 215 may include a recess to receive and support integrated circuitry and antenna device 230. Housing 200 may be incorporated into and integral as a portion of eyeglasses 105 or another wearable device 105, or in other embodiments may be separately affixed or attached to eyeglasses 105 or another wearable device 105.

Figure 5:
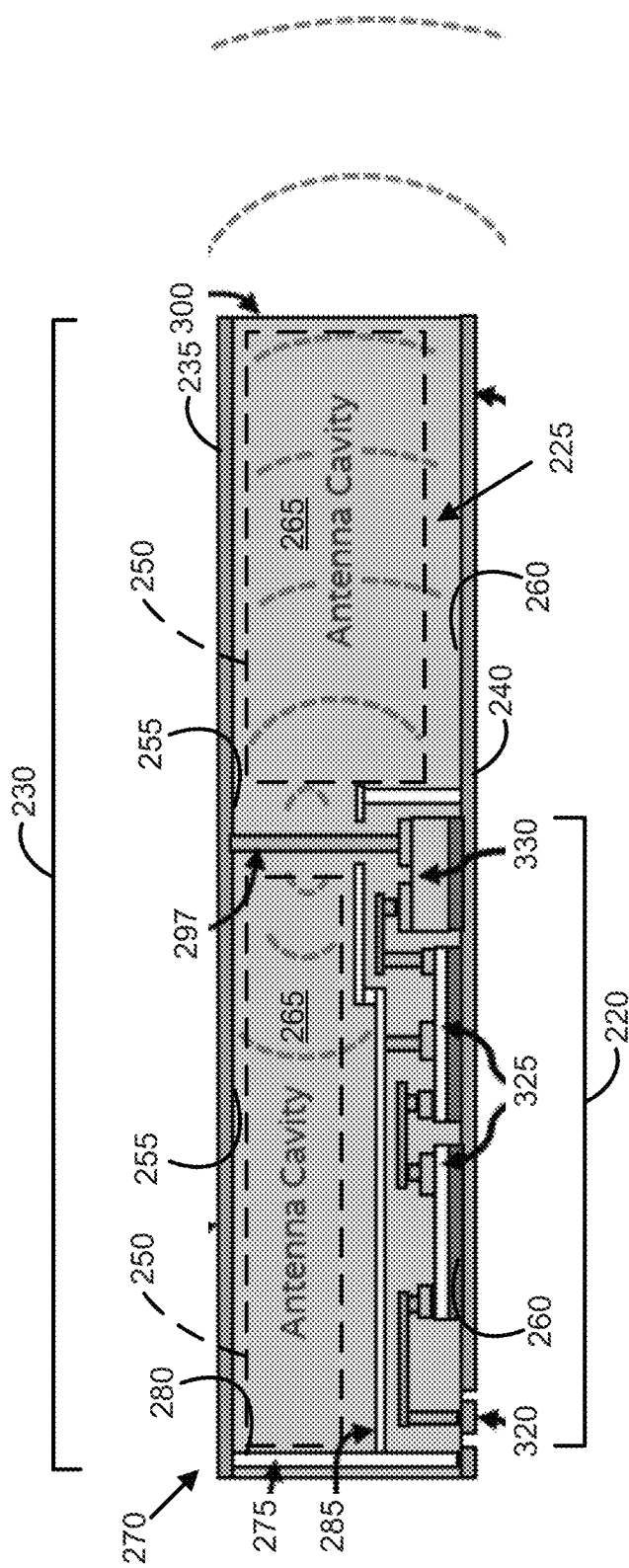
FIG. 5 is an enlarged sectional side view of an integrated circuitry and antenna device, according to some embodiments.

FIG. 5 is an enlarged sectional side view of integrated circuitry and antenna device 230 illustrating circuitry 220 and antenna 225. Integrated circuitry and antenna device 230 may be generally flat and/or planar as illustrated in FIGS. 3 and 4, for example, with respect to wearable device 105. In embodiments, antenna 225 may be and/or may operate as a slotted cavity radiator and may be referred to as cavity antenna 225.

Integrated circuitry and antenna device 230 may include a top panel 235 and a spaced-apart, opposed bottom panel 240 that may define and/or bound between them an antenna cavity 250 (generally outlined in dashed lines). Panels 235 and 240 may be conductive at least at their inner faces 255 and 260 and may form a top ground and a bottom ground, respectively, for antenna cavity 250. Panels 235 and 240 may be formed of conductive metal or may be formed of another material and may include a conductive coating or layer at respective inner faces 255 and 260.

Antenna cavity 250 may contain or may be filled by a dielectric material 265. As one example, dielectric material 265 may include Rogers TMM 10i material (e.g., dielectric constant er=9.8), available from Rogers Corporation as a thermoset resin. In some embodiments, a thermoset resin may be a prepolymer in a soft solid or viscous state that may change irreversibly into an infusible, insoluble polymer network by curing. In embodiments, curing may be induced by the action of heat or suitable radiation, often under high pressure. It will be appreciated that other dielectric materials 265 may be used.

At least one side or end of antenna cavity 250, such as a posterior end 270, may be closed between panels 235 and 240 by an end wall 275. In embodiments, end wall 275 may form a non-radiating face and may be conductive at least at its inner face 280, in a manner similar to panels 235 and 240, and may form or operate as a ground via wall. In embodiments, any or all of sides 290 (FIG. 4) and 295 (FIG. 3) and end 300 (FIG. 3) of antenna cavity 250 and dielectric material 265 may be otherwise open (e.g., be without conductive layers over them, and so sometimes may be referred to as openings) so as to receive and/or transmit transmissive communications.

Circuitry 220 may be supported and/or mounted on at least one of panels 235 and 240 (e.g., panel 240) and optionally may be shielded from antenna cavity 250 by a shield layer 285. One or more cavity excitation vias (e.g., only one cavity excitation via 297 shown) may be coupled to circuitry 220 and may extend through shield layer 285 into antenna cavity 250. Cavity excitation via 297 may excite antenna cavity 250 to transmit communications via cavity antenna 225 at any or all of open sides 290 and 295 and end 300 of antenna cavity 250, and may likewise receive communications. In embodiments, circuitry 220 may be located toward posterior and 270 and generally away from radiating anterior opening 300, for example, to increase efficiency of cavity antenna 225. Similarly, radiating openings 290, 295, and 300 may be positioned on mobile device 100 to be away from (e.g. laterally away from) the user when worn.

In some embodiments, antenna cavity 250 may operate as or analogous to a regular Substrate Integrated Waveguide (SIW) cavity in which via arrays (or "walls") may connect two conducting layers 255 and 260 to form transverse walls of the cavity antenna 225. In embodiments, antenna cavity 250 as illustrated in FIG. 5, for example, may have an irregular cross section due to the presence of circuitry 220 and optional shield layer 285, and such an irregular cross section may provide design flexibility and variations in cavity antenna 225, as described in greater detail below.

In embodiments, a cavity resonator such as cavity antenna 225 may include an enclosed conductive structure or cavity, such as antenna cavity 250, that may contain electromagnetic (EM) waves that may reflect back and forth between conductive cavity walls (e.g., conductive layers 255 and 260). The shape and size of antenna cavity 250 may correspond to a resonant frequency and EM modes. For example, in the case of square cavities, a dominant transverse electric (TE) resonance mode can be excited for a cavity with sides given roughly by:

$$L_{FullMode} \approx \frac{\lambda_0}{2} \frac{1}{\sqrt{\varepsilon_r}}$$

where $\lambda_0$ may be a free-space wavelength corresponding to a the desired resonance frequency and $\varepsilon_r$ may be a dielectric constant of a substrate. In this example, a cavity can be called a "Full-Mode" cavity. With an all-side-enclosed metal structure, the EM energy is stored inside the cavity resonator. However, if openings are made to the cavity, the energy can leak out and the cavity can be used as a cavity antenna. For example, a cavity with two sides open may be called a "Quarter-Mode" cavity.

A cavity antenna can include any of many different dielectric substrate materials. However, embodiments may employ low-loss dielectrics. In some embodiments, a cavity antenna may offer fixed, single, narrow band. In other embodiments, a multi-section cavity antenna with regular or irregular dimensions and/or contours may result in multi-band operation, improved bandwidth and/or enhanced efficiency. Embodiments may be suitable for various wireless communications, such as WiFi, Bluetooth (BT) and Long-Term Evolution (LTE), etc.

Circuitry 220 may include digital and/or analog circuitry to provide digital data processing as well as wireless communications, as described below in greater detail with reference to FIG. 10. In general, embodiments of circuitry 220, as schematically illustrated in FIG. 5, may include one or more power and/or input/output contacts 320 for connecting mobile device 100 to a power source and/or a host computer or processor (not shown). Circuitry 220 may also include digital circuitry 325 for data processing and analog circuitry 330 for wireless communication.

In embodiments, eyeglasses 105 with integrated and/or integral mobile device 100 may operate as smart glasses or a smart-glasses wearable device. Mobile device 100, with integrated circuitry and antenna device 230, may have a low-profile industrial design that may provide improved user experience. In embodiments, integrated circuitry and antenna device 230 may operate as a module of digital circuitry and antenna and radio frequency (RF) components, which may be used without modification in a variety of wearable devices 105, including eyeglasses 105 with a variety of industrial and/or cosmetic designs that may use various combinations of metals and/or plastics, for example.

For example, cavity antenna 225 may provide consistent performance and/or operation in the presence of wearable device materials and/or shapes, including eyeglasses 105 with metal or non-metal frames and/or temples that may include curved profiles to follow the contours of user's heads. User head presence may significantly reduce the radiation performance of some other antennas due to high E-field absorption and antenna de-tuning. Also, RF system performance can be easily degraded due to the noise generated by high-speed and/or digital processing components and harmonic signals generated by them in some systems. Integrated circuitry and antenna device 230, with cavity antenna 225, may overcome such shortcomings.

In embodiments, antenna cavity 250 may have a size, or volume, that may be selected or adapted according to a size, form-factor, and/or configuration of wearable device 105, such as eyeglasses 105, for example, as well as operating frequencies for wireless communications. Also, the dielectric coefficient or permittivity of dielectric material 265 may also be a factor. In some embodiments, for example, relevant communication frequencies may include any of 1.5 GHz as may be employed by GPS systems, 2.1 GHz as may be employed in some cellular or mobile telephone systems, 2.4 GHz as may be employed in some Wi-Fi and/or Bluetooth systems, etc. In connection with such systems, embodiments of antenna cavity 250 may be formed with nominal dimensions of about 30 mm×10 mm×1 mm, for example. In an embodiment such as eyeglasses device 105, for example, the dimension of 30 mm may extend generally along an anterior-posterior axis of a glasses temple, the dimension of 10 mm may extend generally along a superior-inferior axis, and the dimension of 1 mm may extend generally along a medial-lateral axis.

Figure 6:
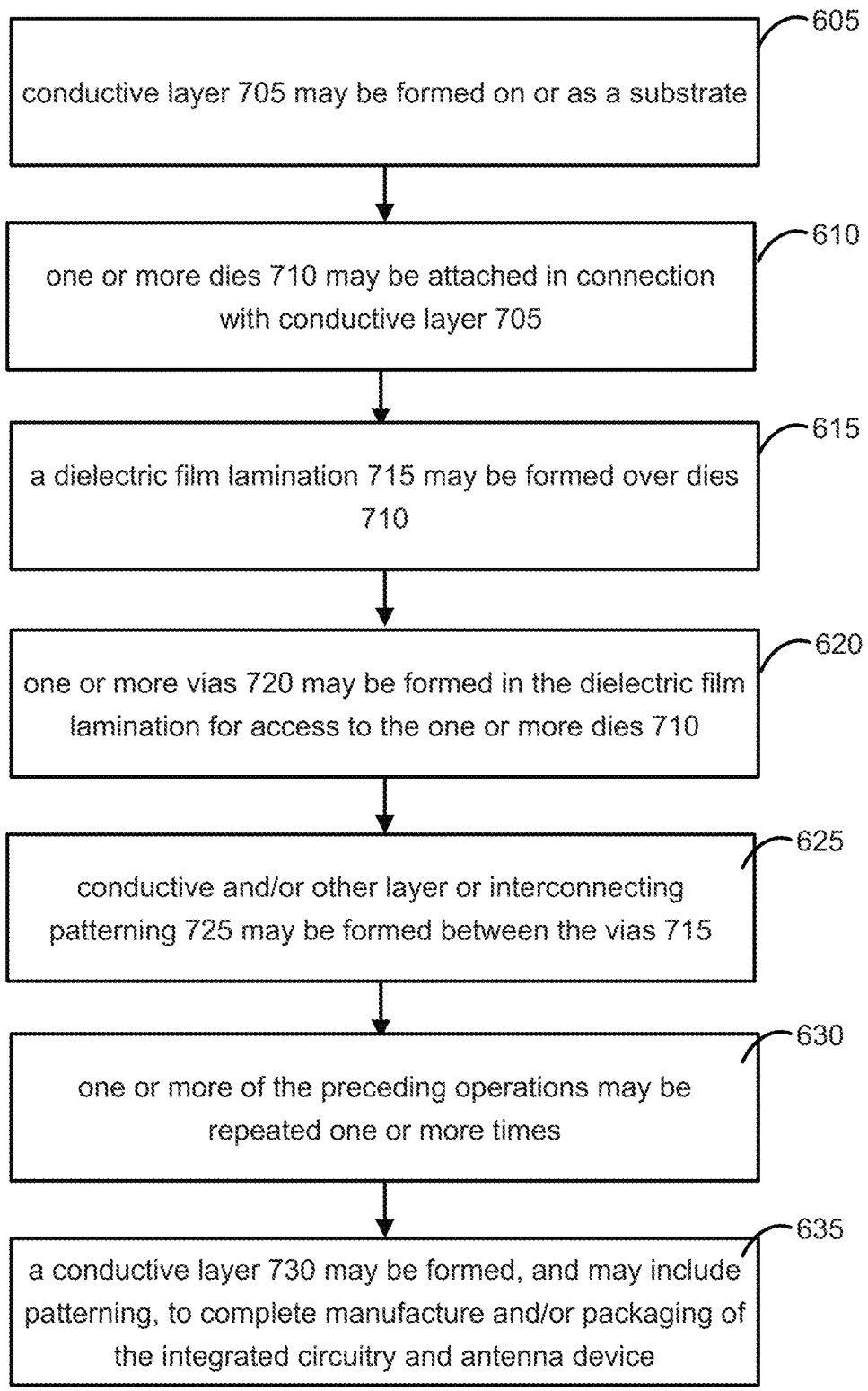
FIG. 6 is a flow diagram of an embodiment operation that may be employed to manufacture and/or package an integrated circuitry and antenna device, according to some embodiments.
Figure 7:
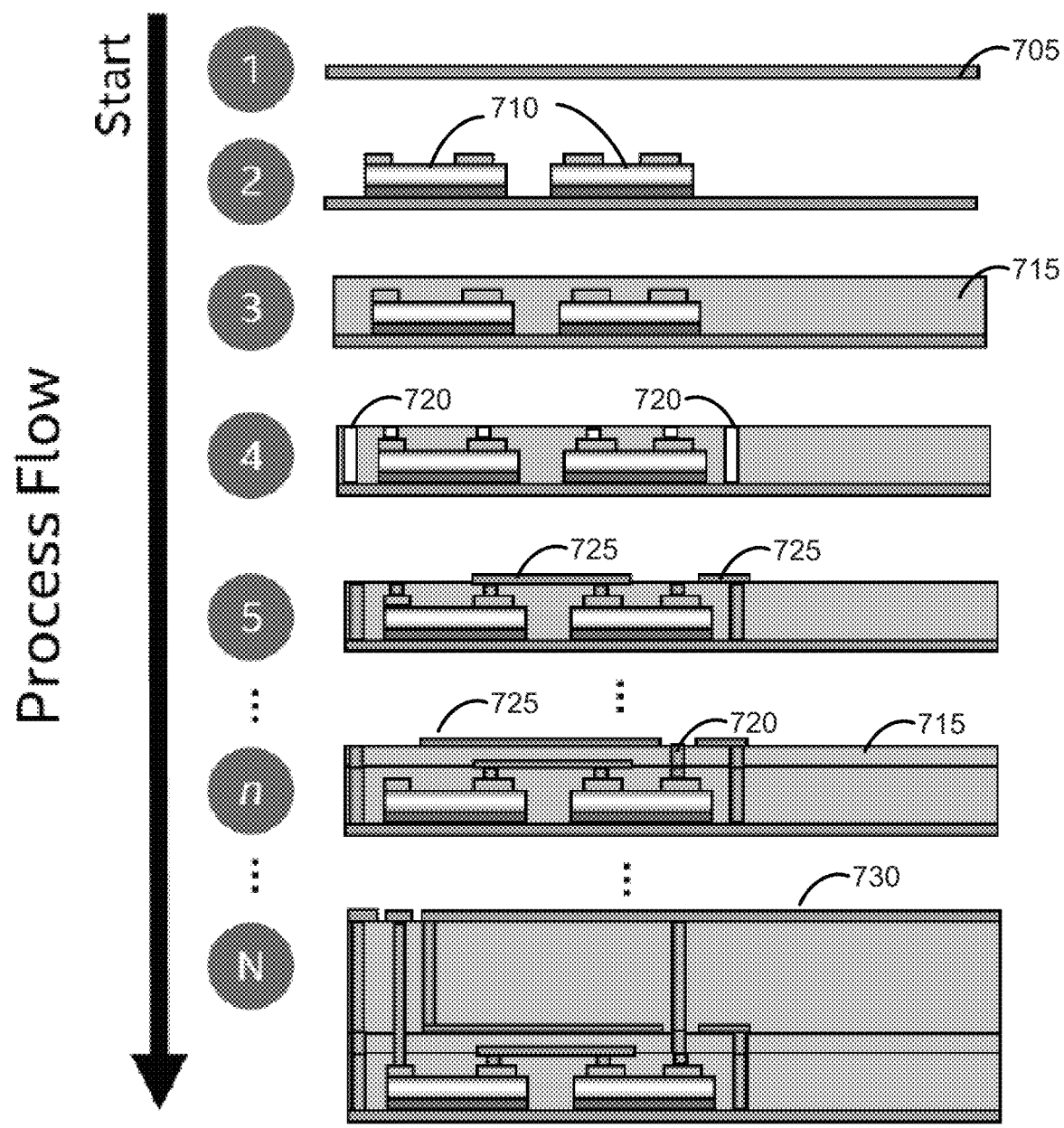
FIG. 7 is illustrations of device component layers that may be manufactured and/or packaged according to operations of FIG. 6.

FIGS. 6 and 7 are a flow diagram and illustrations of corresponding device component layers, respectively, of an embodiment operation that may be employed to manufacture and/or package an integrated circuitry and antenna device analogous to integrated circuitry and antenna device 320. In one embodiment, an electronics packaging and/or manufacturing operation such as Bumpless Build-up Layering (BBUL) may be employed. However, other packaging technologies and/or methodologies may be employed. As a result, integrated circuitry and antenna device 320 may be formed with sufficient compactness as to be usable as a modular component in a wide variety of wearable devices, including various styles of eyeglasses, without requiring modification of cavity antenna 225 or other components.

At 605, a conductive layer 705 may be formed on or as a substrate.

At 610, one or more dies 710 may be attached in connection with conductive layer 705. The one or more dies 710 may correspond to separate digital and/or analog components of circuitry 220.

At 615, a dielectric film lamination may be formed over dies 710.

At 620, one or more vias 715 may be formed in the dielectric film lamination for access to the one or more dies 710.

At 625, conductive and/or other layer or interconnecting patterning 720 may be formed between the vias 715.

At 630, one or more of the preceding operations may be repeated one or more times.

At 635, a conductive layer 725 may be formed, and may include patterning, to complete manufacture and/or packaging of the integrated circuitry and antenna device An aspect of the operations of FIG. 6 is that they may provide low cost manufacture of integrated circuitry and antenna device 320. For example interconnecting patterning 720 may avoid conventional coaxial cabling that may be employed between radio circuitry and an antenna. Similarly, interconnection between other system components may be provided by low cost, low-frequency interconnects.

Figure 8:
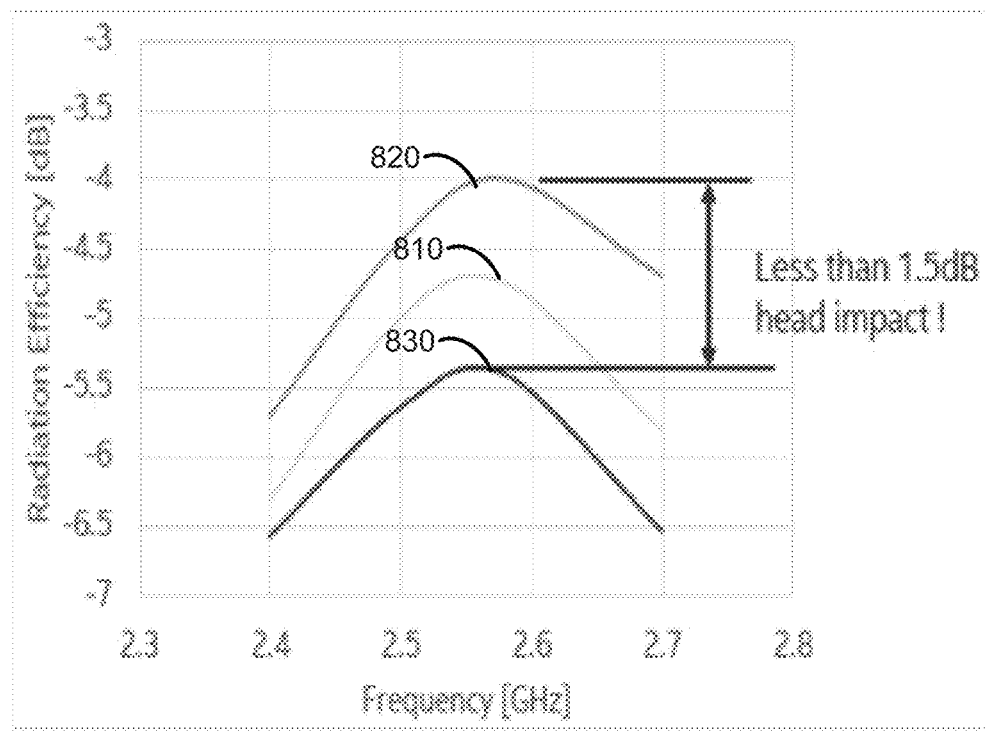
FIG. 8 is a graph illustrating simulated radiation efficiency over a frequency range in connection with embodiments described herein.

FIG. 8 is a graph 800 illustrating simulated radiation efficiency (dB) over a frequency range of about 2.4 GHz-2.7 GHz in connection with embodiments described herein, such as integrated circuitry and antenna device 320, with a graph trace 810 corresponding to stand-alone operation, a graph trace 820 corresponding to operation with device 320 incorporated into a wearable device such as eyeglasses 105, but not worn by a user, and a graph trace 830 corresponding to device 320 incorporated into a wearable device such as eyeglasses 105 and also worn on a user's head. Graph traces 820 and 830 indicate that embodiments have a change in radiation efficiency of less than about 1.5 dB, for a wearable device that is headworn compared to it not being worn. Such a low change in radiation efficiency indicates that embodiments of integrated circuitry and antenna device 320 are advantageously resilient to being headworn.

Figure 9:
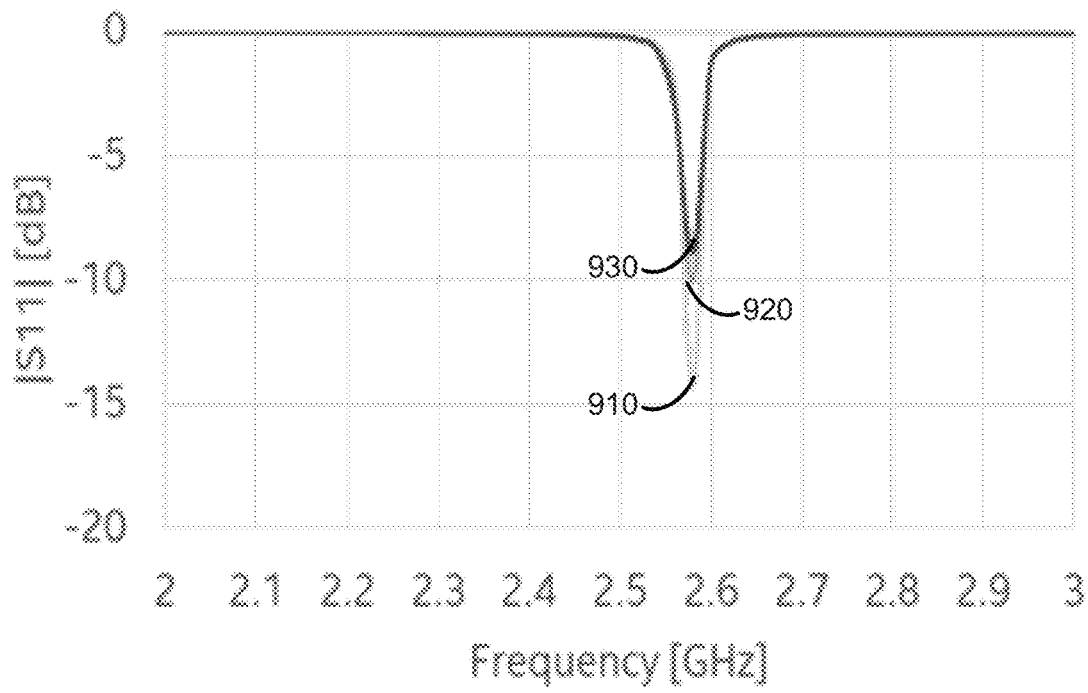
FIG. 9 is a graph illustrating S-parameter return loss over a frequency range in connection with embodiments described herein.

FIG. 9 is a graph 900 illustrating S-parameter return loss (dB) over a frequency range of about 2 GHz to 3 GHz, indicating a peak return loss 910 corresponding to standalone operation of integrated circuitry and antenna device 320, a peak return loss 920 corresponding to operation with device 320 incorporated into a wearable device such as eyeglasses 105, but not worn by a user, and a peak return loss 930 corresponding to device 320 incorporated into a wearable device such as eyeglasses 105 and also worn on a user's head. Graph 900 also advantageous operation of device 320, even in headworn conditions.

Embodiments described herein may include integration of mobile device circuitry 220, which may include radio circuitry, within a cavity radiator so that mobile device 100 may operate as a substantially metallic headworn wearable device 105 and with minimal antenna performance impact when worn. Embodiments may provide low user body absorption of EM energy and corresponding high antenna efficiency, even for a range of user body sizes. As a result, embodiments may be employed in a variety of wearable devices as a modular component without significant performance variation arising from device component materials and or the device being worn during operation.

In addition, packaging operations may provide integrated circuitry and antenna device 320 with compactness that may be suitable for wearable devices 105 with significant size constraints, such as headworn devices like glasses 105. Integrated circuitry and antenna device 320 may also provide noise coupling reduction, wherein antenna fields may be confined substantially within cavity 250 and substantially without electromagnetic interference with circuit components.

In some embodiments, mobile device 100 and/or circuitry 220 may include components as described below in greater detail with reference to FIG. 10.

Figure 10:
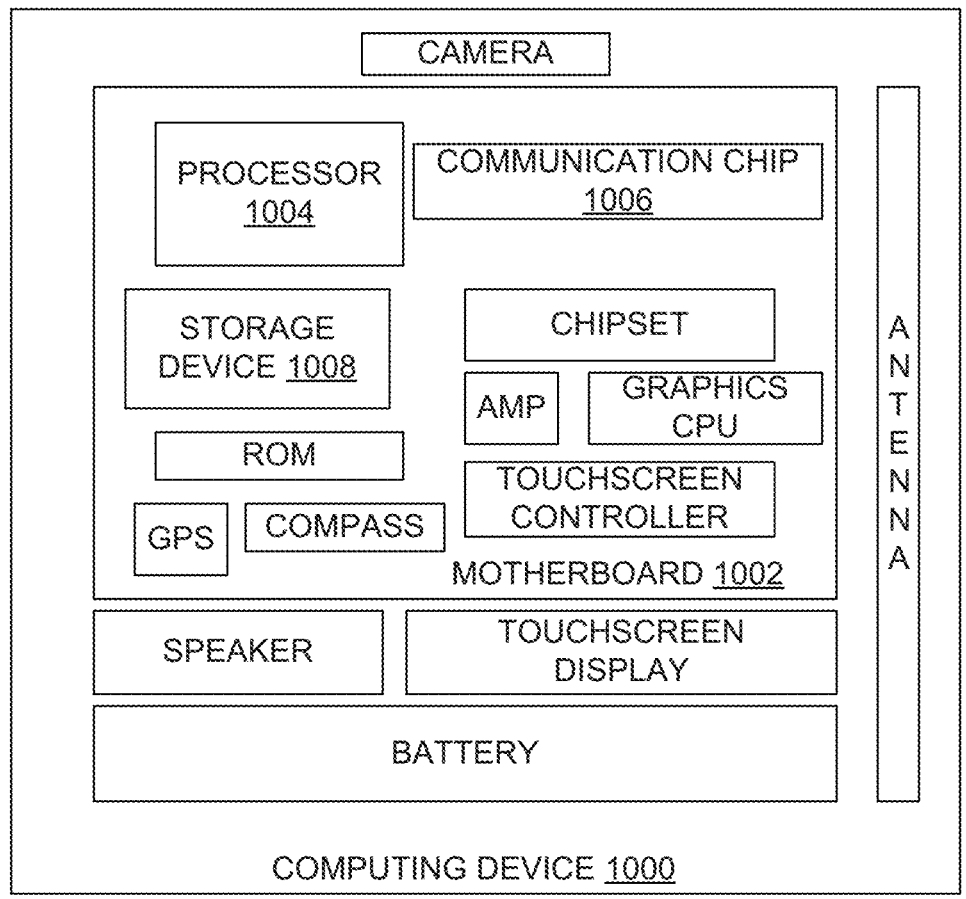
FIG. 10 schematically illustrates a computing device which, in accordance with some embodiments, may include one or more example components of a mobile device, according to some embodiments.

FIG. 10 schematically illustrates a computing device 1000 which, in accordance with some embodiments, may include one or more components of a mobile device 100. In embodiments, circuitry 220 of device 100 may include one or more elements of the computing device 1000.

The computing device 1000 may be, for example, a mobile communication device. The computing device 1000 may house a board such as a motherboard 1002. The motherboard 1002 may include a number of components, including (but not limited to) a processor 1004 and at least one communication chip 1006. Any of the components discussed herein with reference to the computing device 1000 may be arranged in or thermally coupled with an exposable thermally-conductive panel, as described earlier. In further implementations, the communication chip 1006 may be part of the processor 1004.

The computing device 1000 may include a storage device 1008. In some embodiments, the storage device 1008 may include one or more solid state drives. Examples of storage devices that may be included in the storage device 1008 include volatile memory (e.g., dynamic random access memory (DRAM)), non-volatile memory (e.g., read-only memory, ROM), flash memory, and so forth).

Depending on its applications, the computing device 1000 may include other components that may or may not be physically and electrically coupled to the motherboard 1002. These other components may include, but are not limited to, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, a Geiger counter, an accelerometer, a gyroscope, a speaker, and a camera.

The communication chip 1006 and the antenna may enable wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible broadband wide region (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1006 may operate in accordance with a Global System for Mobile Communications (GSM), General Packet Radio Service (GPRS), Universal Mobile Telecommunications System (UMTS), High Speed Packet Access (HSPA), Evolved HSPA (E-HSPA), or LTE network. The communication chip 1006 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1006 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 1006 may operate in accordance with other wireless protocols in other embodiments.

The computing device 1000 may include a plurality of communication chips 1006. For instance, a first communication chip 1006 may be dedicated to shorter range wireless communications such as Wi-Fi and Bluetooth, and a second communication chip 1006 may be dedicated to longer range wireless communications such as GPS, EDGE, GPRS, CDMA, WiMAX, LTE, EV-DO, and others. In some embodiments, the communication chip 1006 may support wired communications. For example, the computing device 1000 may include one or more wired servers.

The processor 1004 and/or the communication chip 1006 of the computing device 1000 may include one or more dies or other components in an IC package. Such an IC package may be coupled with an interposer or another package using any of the techniques disclosed herein. The term "processor" may refer to any device or portion of a device that processes electronic data from registers and/or memory to transform that electronic data into other electronic data that may be stored in registers and/or memory.

In various implementations, the computing device 800 may be a wearable device, a laptop, a netbook, a notebook, an ultrabook, a smartphone, a tablet, a personal digital assistant (PDA), an ultra mobile PC, a mobile phone, a digital camera, a portable music player, or a digital video recorder. In further implementations, the computing device 700 may be any other electronic device that processes data.

Thus various example embodiments of the present disclosure have been described including, but are not limited to:

Example 1 may include a mobile device, which may comprise: circuitry for transmissive communication; and a slotted cavity radiator in communication with the circuitry for transmissive communication to transmit or receive transmissive communication.

Example 2 may include the mobile device of example 1 and may further comprise a pair of conductive faces between which the circuitry for transmissive communication may be positioned and that may bound a cavity of the slotted cavity radiator.

Example 3 may include the mobile device of example 2 and may further comprise an electromagnetic shield between the circuitry for transmissive communication and the slotted cavity radiator.

Example 4 may include the mobile device of example 2 and may further comprise a cavity excitation conductor positioned within the cavity and wherein the circuitry for transmissive communication may be coupled to the cavity excitation conductor to transmit or receive transmissive communication.

Example 5 may include the mobile device of example 2 wherein the cavity of the slotted cavity radiator may contain a dielectric material.

Example 6 may include the mobile device of example 2 wherein the mobile device may be included as part of a wearable device.

Example 7 may include the mobile device of example 7 wherein the mobile device may include a medial face to be worn proximal to a body and a lateral face to be worn distal from the body, relative to the medial face, and wherein the slotted cavity radiator may include a slotted aperture at the lateral face.

Example 8 may include the mobile device of example 7 and may further comprise wherein the wearable device may be headworn.

Example 9 may include the mobile device of example 8 wherein the mobile device may include an anterior end and a posterior end and the slotted aperture may be positioned toward the anterior end of the mobile device.

Example 10 may include the mobile device of example 8 wherein the wearable device may include eyeglasses and the mobile device may be included as a temple of the eyeglasses.

Example 11 may include a headworn apparatus, which may comprising: circuitry for transmissive communication; a slotted cavity radiator in communication with the circuitry for transmissive communication to transmit or receive transmissive communication; and pair of conductive faces between which the circuitry for transmissive communication may be positioned and that bound a cavity of the slotted cavity radiator.

Example 12 may include the apparatus of example 11 and may further comprise an electromagnetic shield between the circuitry for transmissive communication and the slotted cavity radiator.

Example 13 may include the apparatus of example 11 and may further comprise a cavity excitation conductor positioned within the cavity and wherein the circuitry for transmissive communication may include circuitry coupled to the cavity excitation conductor to transmit or receive the transmissive communication.

Example 14 may include the apparatus of example 11 wherein the cavity of the slotted cavity radiator may contain a dielectric material.

Example 15 may include the apparatus of example 11 and may further comprise a medial face to be worn proximal to a body and a lateral face to be worn distal from the body, relative to the medial face, and wherein the slotted cavity radiator may include a slotted aperture adjacent the lateral face.

Example 16 may include the apparatus of example 15 and may further comprise an anterior end and a posterior end and wherein the slotted aperture may be positioned toward the anterior end.

Example 17 may include the apparatus of example 11 wherein the apparatus may include eyeglasses.

Example 18 may include a wearable mobile device, which may comprise: circuitry for transmissive communication; and a slotted cavity radiator in communication with the circuitry for transmissive communication to transmit or receive transmissive communication.

Example 19 may include the wearable mobile device of example 18 and may further comprise a pair of conductive faces between which the circuitry for transmissive communication may be positioned and that may bound a cavity of the slotted cavity radiator.

Example 20 may include the wearable mobile device of example 19 and may further comprise a cavity excitation conductor positioned within the cavity and wherein the circuitry for transmissive communication may include circuitry coupled to the cavity excitation conductor to transmit or receive the transmissive communication.

Example 21 may include the wearable mobile device of example 19 wherein the cavity of the slotted cavity radiator may contain a dielectric material.

Example 22 may include the wearable mobile device of example 18 and may further comprise a medial face to be worn proximal to a body and a lateral face to be worn distal from the body, relative to the medial face, and wherein the slotted cavity radiator includes a slotted aperture adjacent the lateral face.

Example 23 may include the wearable mobile device of example 22 and may further comprise an anterior end and a posterior end and wherein the slotted aperture may be positioned toward the anterior end.

Example 24 may include a method, which may comprise: forming a first bounding conductive layer; applying one or more circuit dies; applying one or more successive layers of dielectric material and conductive interconnections; and forming a second bounding conductive layer substantially parallel to the first conductive bounding layer, wherein at least one of the layers dielectric material forms between the first and second bounding conductive layers a slotted cavity radiator.

Example 25 may include the method of example 24 wherein the one or more circuit dies provide transmissive communication for a mobile device.

Example 26 may include a mobile device, which may comprise: circuitry for transmissive communication; and a slotted cavity radiator in communication with the circuitry for transmissive communication to transmit or receive transmissive communication.

Example 27 may include the mobile device of example 26 and may further comprise a pair of conductive faces between which the circuitry for transmissive communication may be positioned and that may bound a cavity of the slotted cavity radiator.

Example 28 may include the mobile device of examples 26 or 27 and may further comprise an electromagnetic shield between the circuitry for transmissive communication and the slotted cavity radiator.

Example 29 may include the mobile device of example 27 and may further comprise a cavity excitation conductor positioned within the cavity and wherein the circuitry for transmissive communication may be coupled to the cavity excitation conductor to transmit or receive transmissive communication.

Example 30 may include the mobile device of example 27 or 29 wherein the cavity of the slotted cavity radiator may contain a dielectric material.

Example 31 may include the mobile device of any of examples 26, 27, or 29 wherein the mobile device is included as part of a wearable device.

Example 32 may include the mobile device of example 31 wherein the mobile device includes a medial face to be worn proximal to a body and a lateral face to be worn distal from the body, relative to the medial face, and wherein the slotted cavity radiator may include a slotted aperture at the lateral face.

Example 33 may include the mobile device of example 32 wherein the wearable device is headworn.

Example 34 may include the mobile device of example 33 wherein the mobile device may include an anterior end and a posterior end and the slotted aperture may be positioned toward the anterior end of the mobile device.

Example 35 may include the mobile device of example 33 wherein the wearable device may include eyeglasses and the mobile device may be included as a temple of the eyeglasses.

Example 36 may include a headworn apparatus, which may comprise: circuitry for transmissive communication; a slotted cavity radiator in communication with the circuitry for transmissive communication to transmit or receive transmissive communication; and pair of conductive faces between which the circuitry for transmissive communication is positioned and that bound a cavity of the slotted cavity radiator.

Example 37 may include the apparatus of example 36 and may further comprise an electromagnetic shield between the circuitry for transmissive communication and the slotted cavity radiator.

Example 38 may include the apparatus of example 36 or 37 and may further comprise a cavity excitation conductor positioned within the cavity and wherein the circuitry for transmissive communication may include circuitry coupled to the cavity excitation conductor to transmit or receive the transmissive communication.

Example 39 may include the apparatus of example 36 or 37 wherein the cavity of the slotted cavity radiator may contain a dielectric material.

Example 40 may include the apparatus of example 36 or 37 and may further comprise a medial face to be worn proximal to a body and a lateral face to be worn distal from the body, relative to the medial face, and wherein the slotted cavity radiator may include a slotted aperture adjacent the lateral face.

Example 41 may include the apparatus of example 40 and may further comprise an anterior end and a posterior end and wherein the slotted aperture may be positioned toward the anterior end.

Example 42 may include the apparatus of example 36 or 37 wherein the apparatus may include eyeglasses.

Example 43 may include a wearable mobile device, which may comprise: circuitry for transmissive communication; and a slotted cavity radiator in communication with the circuitry for transmissive communication to transmit or receive transmissive communication.

Example 44 may include the wearable mobile device of example 43 and may further comprise a pair of conductive faces between which the circuitry for transmissive communication may be positioned and that may bound a cavity of the slotted cavity radiator.

Example 45 may include the wearable mobile device of example 44 and may further comprise a cavity excitation conductor positioned within the cavity and wherein the circuitry for transmissive communication may include circuitry coupled to the cavity excitation conductor to transmit or receive the transmissive communication.

Example 46 may include the wearable mobile device of example 44 or 45 wherein the cavity of the slotted cavity radiator contains a dielectric material.

Example 47 may include the wearable mobile device of any of examples 43-45 and may further comprise a medial face to be worn proximal to a body and a lateral face to be worn distal from the body, relative to the medial face, and wherein the slotted cavity radiator may include a slotted aperture adjacent the lateral face.

Example 48 may include the wearable mobile device of example 47 and may further comprise an anterior end and a posterior end and wherein the slotted aperture may be positioned toward the anterior end.

Example 49 may include a method, which may comprise: forming a first bounding conductive layer; applying one or more circuit dies; applying one or more successive layers of dielectric material and conductive interconnections; and forming a second bounding conductive layer substantially parallel to the first conductive bounding layer, wherein at least one of the layers dielectric material forms between the first and second bounding conductive layers a slotted cavity radiator.

Example 50 may include the method of example 49, wherein the one or more circuit dies may provide transmissive communication for a mobile device.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A wearable mobile device, comprising:
   circuitry for transmissive communication;
   a slotted cavity radiator in communication with the circuitry for transmissive communication to transmit or receive transmissive communications;
   a pair of conductive faces between which the circuitry for transmissive communication is positioned and that bound a cavity of the slotted cavity radiator; and
   a medial face to be worn proximal to a body and a lateral face to be worn distal from the body, relative to the medial face, wherein the slotted cavity radiator includes a slotted aperture at the lateral face.

2. The mobile device of claim 1 further comprising an electromagnetic shield between the circuitry for transmissive communication and the slotted cavity radiator.

3. The mobile device of claim 1 further comprising a cavity excitation conductor positioned within the cavity and wherein the circuitry for transmissive communication is coupled to the cavity excitation conductor to transmit or receive transmissive communication.

4. The mobile device of claim 1 wherein the cavity of the slotted cavity radiator contains a dielectric material.

5. The mobile device of claim 1 wherein the wearable device is headworn.

6. The mobile device of claim 5 wherein the mobile device includes an anterior end and a posterior end and the slotted aperture is positioned toward the anterior end of the mobile device.

7. The mobile device of claim 5 wherein the wearable device includes eyeglasses and the mobile device is included as a temple of the eyeglasses.

8. A headworn apparatus, comprising:
circuitry for transmissive communication;
a slotted cavity radiator in communication with the circuitry for transmissive communication to transmit or receive transmissive communication;
a pair of conductive faces between which the circuitry for transmissive communication is positioned and that bound a cavity of the slotted cavity radiator; and
a medial face to be worn proximal to a body and a lateral face to be worn distal from the body, relative to the medial face, wherein the slotted cavity radiator includes a slotted aperture adjacent the lateral face.

9. The apparatus of claim 8 further comprising an electromagnetic shield between the circuitry for transmissive communication and the slotted cavity radiator.

10. The apparatus of claim 8 further comprising a cavity excitation conductor positioned within the cavity and wherein the circuitry for transmissive communication includes circuitry coupled to the cavity excitation conductor to transmit or receive the transmissive communication.

11. The apparatus of claim 8 wherein the cavity of the slotted cavity radiator contains a dielectric material.

12. The apparatus of claim 8 further including an anterior end and a posterior end and wherein the slotted aperture is positioned toward the anterior end.

13. The apparatus of claim 8 wherein the apparatus includes eyeglasses.

14. A wearable mobile device, comprising:
circuitry for transmissive communication; and
a slotted cavity radiator in communication with the circuitry for transmissive communication to transmit or receive transmissive communication; and
a medial face to be worn proximal to a body and a lateral face to be worn distal from the body, relative to the medial face, wherein the slotted cavity radiator includes a slotted aperture adjacent the lateral face.

15. The wearable mobile device of claim 14 further comprising a pair of conductive faces between which the circuitry for transmissive communication is positioned and that bound a cavity of the slotted cavity radiator.

16. The wearable mobile device of claim 15 further comprising a cavity excitation conductor positioned within the cavity and wherein the circuitry for transmissive communication includes circuitry coupled to the cavity excitation conductor to transmit or receive the transmissive communication.

17. The wearable mobile device of claim 15 wherein the cavity of the slotted cavity radiator contains a dielectric material.

18. The wearable mobile device of claim 14 further including an anterior end and a posterior end and wherein the slotted aperture is positioned toward the anterior end.

* * * * *